United States Patent
Renouard et al.

[11] Patent Number: 5,862,245
[45] Date of Patent: Jan. 19, 1999

[54] METHOD OF EXTRACTING CONTOURS USING A COMBINED ACTIVE CONTOUR AND STARTER/GUIDE APPROACH

[75] Inventors: Frédéric Renouard, Paris; Jamal Rezzouk, Orsay, both of France

[73] Assignee: Alcatel Alsthom Compagnie Generale D'Electricite, Paris, France

[21] Appl. No.: 665,096

[22] Filed: Jun. 14, 1996

[30] Foreign Application Priority Data

Jun. 16, 1995 [FR] France .................................. 95 07212

[51] Int. Cl.$^6$ ............................. G06K 9/00; G06K 9/34; G06K 9/48; G06K 9/46
[52] U.S. Cl. ........................ 382/113; 382/174; 382/199; 382/203; 382/266
[58] Field of Search .................... 382/199, 113, 382/169, 174, 197, 203, 242, 256, 266, 271, 100

[56] References Cited

U.S. PATENT DOCUMENTS

| | | | |
|---|---|---|---|
| 4,361,830 | 11/1982 | Honma et al. | 382/199 |
| 4,941,193 | 7/1990 | Barnsley et al. | 382/249 |
| 5,018,211 | 5/1991 | Jaffe et al. | 382/266 |
| 5,155,774 | 10/1992 | Numagami | 382/113 |
| 5,365,600 | 11/1994 | Nagaishi | 382/266 |
| 5,471,535 | 11/1995 | Ikezawa et al. | 382/199 |
| 5,559,901 | 9/1996 | Lobregt | 382/199 |
| 5,631,970 | 5/1997 | Hsu | 382/113 |
| 5,719,949 | 2/1998 | Koeln et al. | 382/113 |

FOREIGN PATENT DOCUMENTS

0633548A2  1/1995  European Pat. Off. .......... G06T 9/20

OTHER PUBLICATIONS

Henricsson, O. et al, "Controlilng Growing Snakes by Using Key–Points", *Proceedings on the 12th IAPR International Conference On Pattern Recognition*, vol. 1, 9–13 Oct., 1994, Jerusalem, Israel, pp.68–73.

Berger, M. O., "Snake Growing", *Comuter Vision—ECV 90. First European Conference On Computer Vision Proceedings*, 23–27 Apr. 1990, Antibes, France, pp. 570–572.

*Primary Examiner*—Bipin Shalwala
*Attorney, Agent, or Firm*—Sughrue, Mion, Zinn, Macpeak & Seas, PLLC

[57] ABSTRACT

A semi-automatic method of extracting a contour in a digital image using a combined active contour and starter/guide approach is based on an iterative process of deforming an active contour to obtain a current trace and extending the current trace by a straight line segment. An initial contour is entered into the image to seed the iterative process. Local analysis of the digital image at a point of the initial contour determines a first reference datum. At each iteration this analysis is carried out locally at a plurality of points around the end point of the current trace to determine, by correlation with the first datum, the orientation of the straight line segment extending the current trace.

1 Claim, 6 Drawing Sheets

METHOD OF EXTRACTING CONTOURS USING A COMBINED ACTIVE CONTOUR AND STARTER/GUIDE APPROACH

BACKGROUND OF THE INVENTION

1. Field of the Invention

The invention concerns a semi-automatic method of extracting a contour of a contrasted area in a digital image stored in computer memory, in particular a digitized photographic image.

The invention applies in particular to iterative systems aiding the extraction and identification of networks of roads or rivers or coastlines in a digital satellite or aerial image.

2. Description of the Prior Art

The article "Using Dynamic Programming for Minimizing the Energy of Active Contours in the Presence of Hard Constraints" by Amir A. Amini et al, IEEE, Second Int. Conference on Computer Vision, 5 Dec., 1988, TAMPA (Fla.), pages 95–99, describes a contour extraction method based on an iterative process of deforming an active contour using an energy minimizing function. The article "Towards Dynamic Adaptation of Snakes Contours" by Marie-Odile Berger, International Conference Image Analysis & Processing", COMO (Italy), September 1991 also refers to a semi-automatic contour extraction method of this kind.

This prior art method includes the input of an initial contour into the digital image near the contour to be extracted. This initial contour is in the form of a polygonal trace that seeds the iterative process. The iterative process deforms the initial contour until it finds an equilibrium position corresponding to an energy minimum, this equilibrium position defining a part of the trace of the contour to be extracted. This part of the trace is then extended by a straight line segment, the combination being deformed again and this process repeated on each iteration until the process is halted by the operator. On each iteration of the process a function extends the current trace in an extension direction determined by local analysis of the digital image at the end point of the current trace. This local analysis of the image at the current point is conventionally based on determining the tangent to the trace at the current end point or determining the perpendicular to the gradient at the current end point.

The manner in which the current trace is extended is not always satisfactory. In particular, if the contour to be extracted has sudden variations in curvature, the trace tends not to follow these curvature variations. It is then necessary to intervene manually in the deformation process or the active contour extension process to assist the trace to rejoin the contour to be extracted. Such intervention is time-consuming if it is required frequently. This is the case when the contour to be extracted in a digital image is particularly complex, for example when it is a coastline.

SUMMARY OF THE INVENTION

An aim of the invention is to improve the contour extraction method based on an iterative process of deformation of an active contour. A more particular aim of the invention is to remedy the drawbacks mentioned above of the prior art function that extends the current trace.

The basic idea of the invention is to provide in an iterative active contour deformation process a function to extend the current trace that allows for the characteristics of the image not only at the end point of the current trace but also near the end point of the straight line segment extending the current trace.

The invention consists in a semi-automatic method of extracting a contour from a contrasted area in a digital image stored in computer memory by tracing on a display screen the contour to be extracted in the digital image displayed on said screen, said method including the input of an initial contour into the digital image, an iterative process including, for each iteration, the deformation on the screen of an active contour to obtain a current trace of the contour to be extracted and the extension of the current trace by a straight line segment, this process being applied until the final trace of the contour to be extracted is obtained on the screen, the method including a first step of processing pixels of the digital image in a first analysis window centered on a point of the initial contour to determine a reference datum (correlation core) representative of a configuration of the digital image within said first analysis window and a second step, carried out for each iteration of the iterative process, of processing pixels of the digital image in second analysis windows distributed around the current trace end point to determine for each of said second windows, in an analogous manner to the first datum, for each of said second windows, a second datum ("tangent vector") representative of a configuration of the digital image within the second window in question and to determine, by correlating said second datum with said first datum, the orientation of the straight line segment extending the current trace.

Other features and advantages of the invention will emerge more clearly from the following description of one embodiment of the invention.

DETAILED DESCRIPTION OF THE PREFERRED EMBODIMENT

The method of the invention is used to extract the contour of road infrastructures or natural areas in a digital image containing a very large number of pixels, the various intensity levels of the pixels of the image defining contrasted areas. It relates to a digitized satellite or aerial photographic image, for example.

Figure 1:
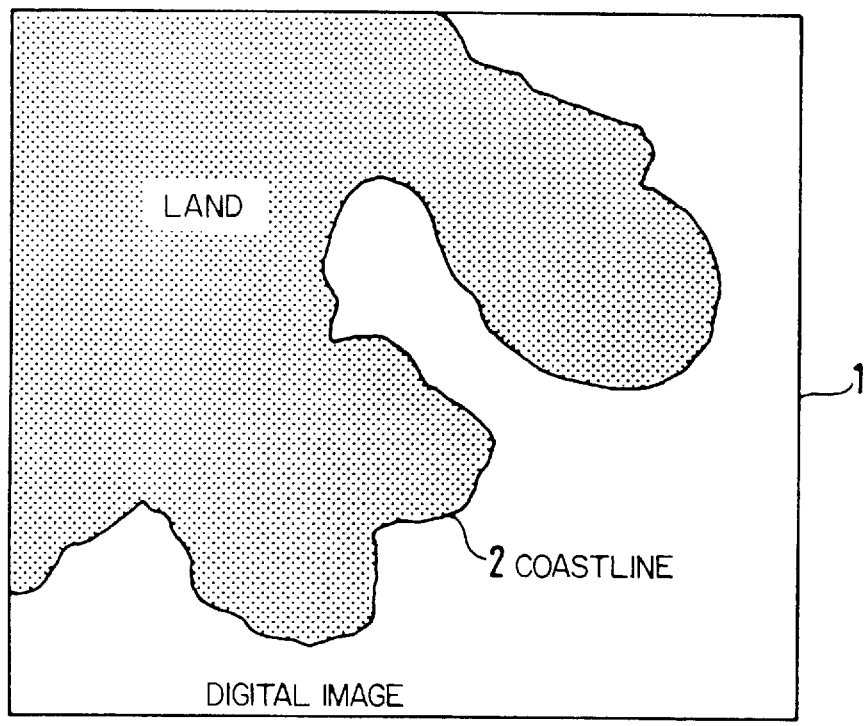
FIG. 1 shows a typical digital image including a coastline to be extracted.

FIG. 1 shows a typical digitized satellite photographic image. A coastline 2 separating the land from the sea can be seen in the digital image 1. The method of the invention is able to extract the contour of this coastline. In particular, this method is able to follow sudden variations of curvature of the coastline.

Figure 2:
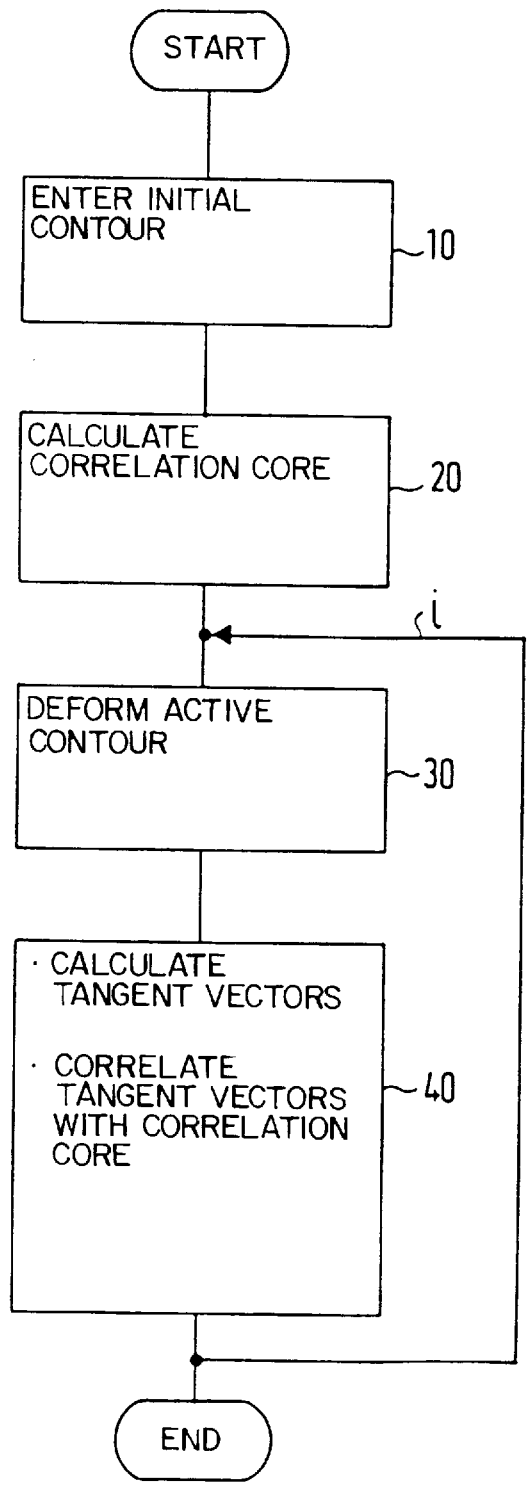
FIG. 2 is a flowchart showing the successive steps of the method of the invention.
Figure 3:
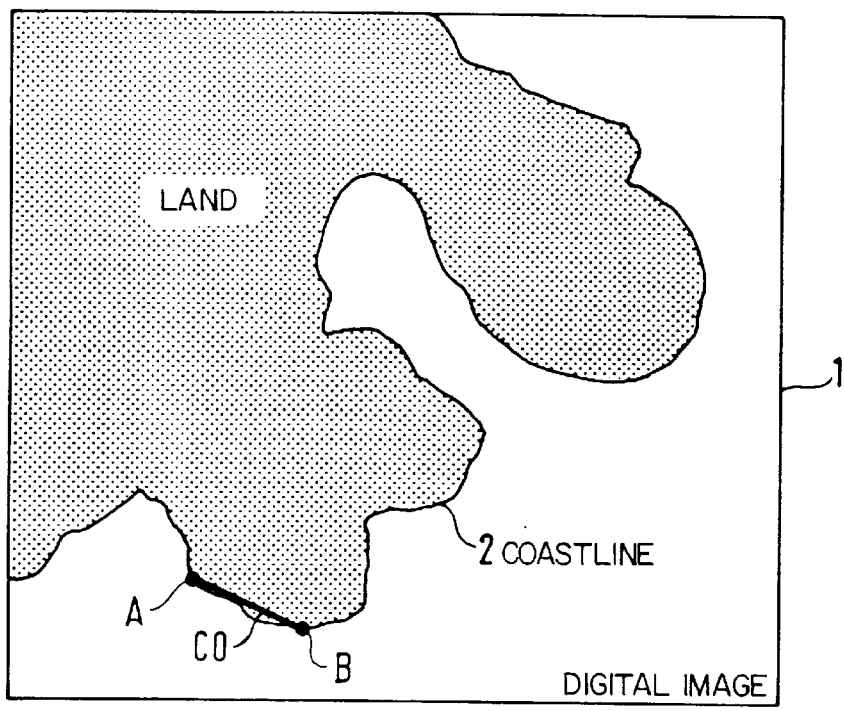
FIG. 3 shows the digital image from FIG. 1 with an initial contour entered into it.

FIG. 2 shows the processing steps of the method of the invention. The method entails entering an initial contour C0 into the digital image (step 10). This initial contour constitutes a starter trace shown here as a straight line segment the ends A and B of which (see FIG. 3) can be defined on the screen using a pointing device of the "mouse" or similar type.

The contour extraction method of the invention uses an iterative process including, for each iteration i, deformation on the screen of the current trace or active contour (starting with the initial contour C0) using an algorithm to minimize the energy of the active contour and extension of the current trace by a straight line segment, the iterative process continuing until the final trace of the contour to be extracted is obtained on the screen, in this example the coastline 2.

Figure 4:
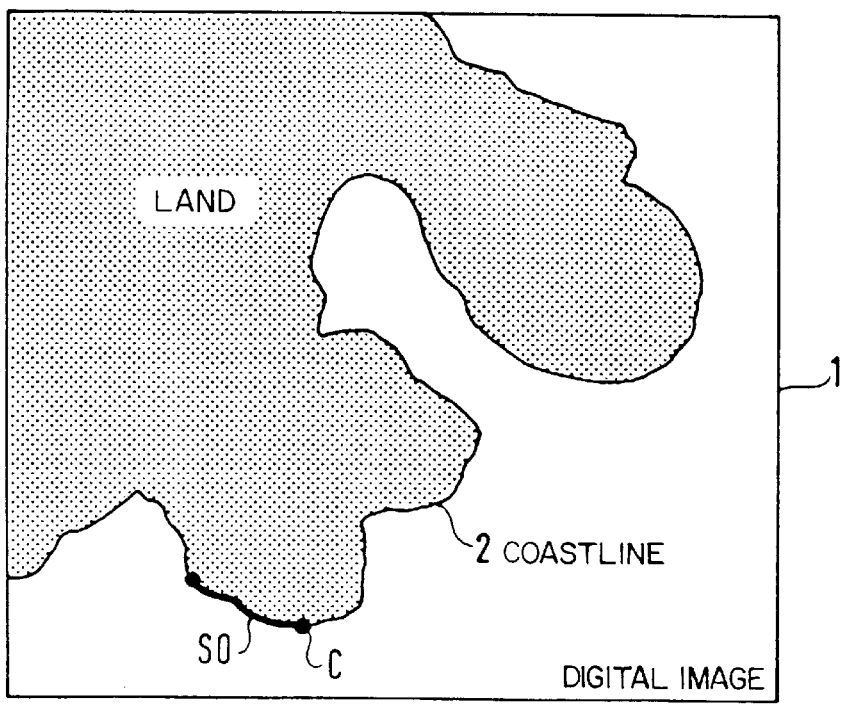
FIG. 4 shows the step of deforming an active contour to obtain a current trace.

Deforming a current trace using an active contour energy minimizing algorithm is known in itself and will not be described hereinafter. On the first iteration of the process the initial contour C0 is deformed until it occupies an equilibrium position defining a current trace S0 shown in FIG. 4. The active contour is deformed in a step 30 which follows on from a step 20 of determining a reference datum called the "correlation core" which is used by the function which extends the current trace in step 40 (FIG. 2).

In step 20, the reference datum is a data vector V determined by local analysis of the pixels of the digital image around a point on the initial contour C0 near the contour to be extracted. This point on the initial contour is preferably one end of the straight line segment C0 placed by means of the designator device in the immediate vicinity of the contour to be extracted, for example the point B.

Figure 5:
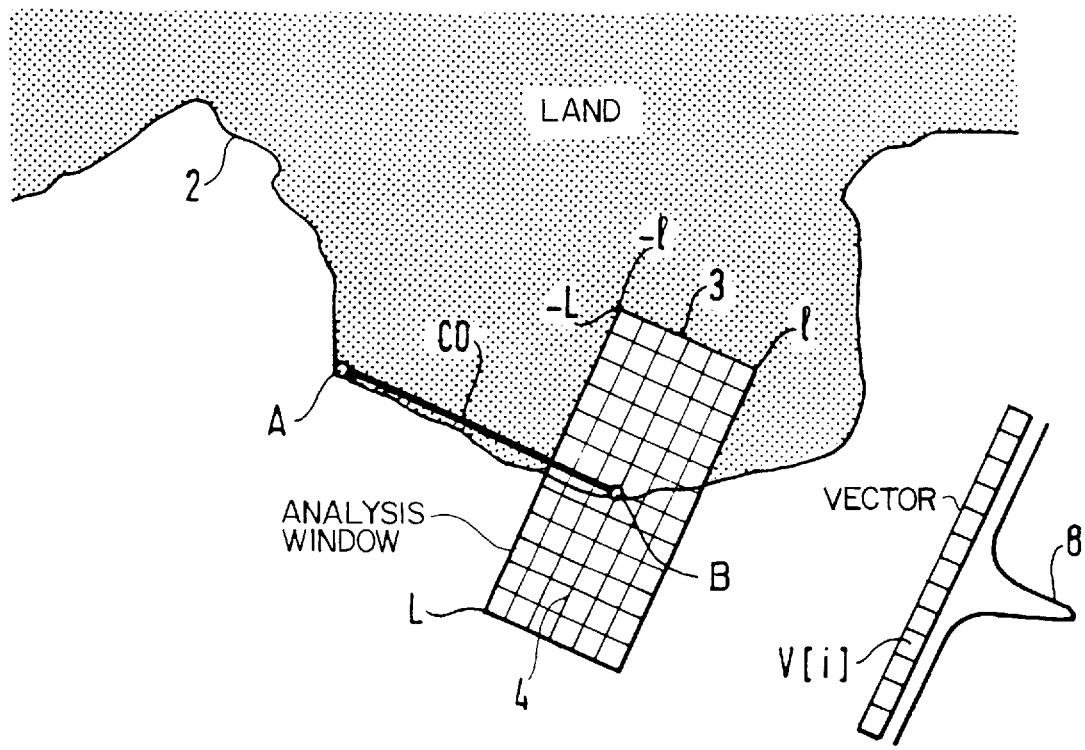
FIGS. 5 through 7 show the processing carried out in a first pixel analysis window to constitute the correlation core.

Local analysis of the pixels of the image at point B entails constructing a data matrix the elements of which are calculated from pixels of the digital image located in an analysis window 3 centered on the point B and oriented so that its longer median line 4 is perpendicular to the straight line segment C0, as shown in FIG. 5.

Figure 6:
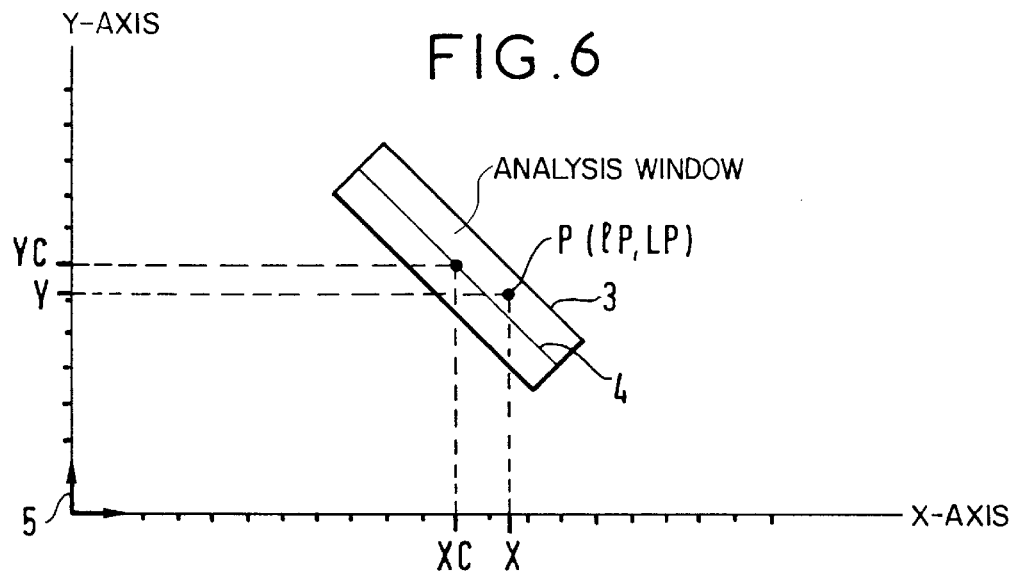

A rectangular grid formed by uneven numbers of rows 1 through −1 and columns L through −L is defined in the analysis window 3. To each intersection of the window grid there corresponds an element I[i,j] of the matrix I. The value of each matrix element I[i,j] is calculated in the following manner (see FIG. 6).

XC and YC are the coordinates of the point at which the window 3 is centered in the system of axes 5 of the digital image, the point B in this example. Xdir and Ydir are the coordinates of a standardized vector in the same direction as the longer median line 4 of the window 3 in the same system of axes.

The coordinates (X,Y) of a point P on the grid in the window 3 for which the row index is IP and the column index is LP in the system of axes 5 are given by the following relation:

X=XC+0.5+IP.Xdir+LP.Ydir

Y=YC+0.5+IP.Ydir−LP.Xdir

Four pixels P0 through P3 are defined near the point P with coordinates in the system of axes 5 obtained from the following relations:

XP0=(int(X)+int(X−int(X)+0.5))+0.5

YP0=(int(Y)+int(Y−int(Y)+0.5))+0.5

XP1=XP0−1

YP1=YP0

XP2=XP0−1

YP2=YP0−1

XP3=XP0

YP3=YP0−1 where int( ) is the integer part function.

Figure 7:
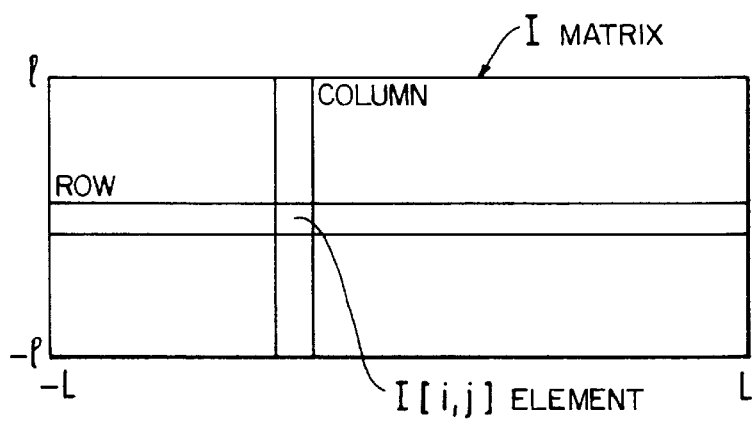
Figure 7:

The value of the element I[i,j] of the matrix I shown in FIG. 7 corresponding to the point P with coordinates (IP, LP) in the window 3 is equal to the intensity level of one of the pixels P0 through P3 in the image 1 if there is a null distance between the point P and that pixel in the system of axes 5. Otherwise the value of the element I[i,j] is given by the following relation:

$$I[i,j] = \frac{\sum_{k=0}^{3} \frac{Int(Pk)}{dk}}{\sum_{k=0}^{3} \frac{1}{dk}}$$

where dk is the distance between the point P and a point Pk (P0, P1, P2 or P3) and Int(Pk) is the value of the intensity of the pixel Pk of the image.

The elements of the data vector V are calculated by processing the matrix I using a calculation operator chosen according to the type of local analysis that best characterizes the contour to be extracted in the context of the digital image. The gradient operator is used in the case of the coastline 2, for example, where there is a clear transition in the pixel intensity level across the contour to be extracted.

In the case of a gradient operator, the value of each element V[i] of the data vector V is equal to the average of the mean gradient at each point of the ith column of the matrix I, as shown in FIG. 7 in which Gk (k=1, 2, 3, 4) denotes a gradient mask. The 2L+1 elements of the vector V are representative of one configuration of the level of the average of the mean gradient along the longer median line of the window 3, shown in FIG. 5 by the curve 8 alongside the window 3.

The data vector V thus constitutes a reference datum called the "correlation core" for the active contour extension step 40 that follows on from the active contour deformation step 30 in each iteration i. On each iteration i the active contour deformation process terminates with a current trace the end of which is identified by the point C in FIG. 4, referred to hereinafter as the current trace end point.

Figure 8:
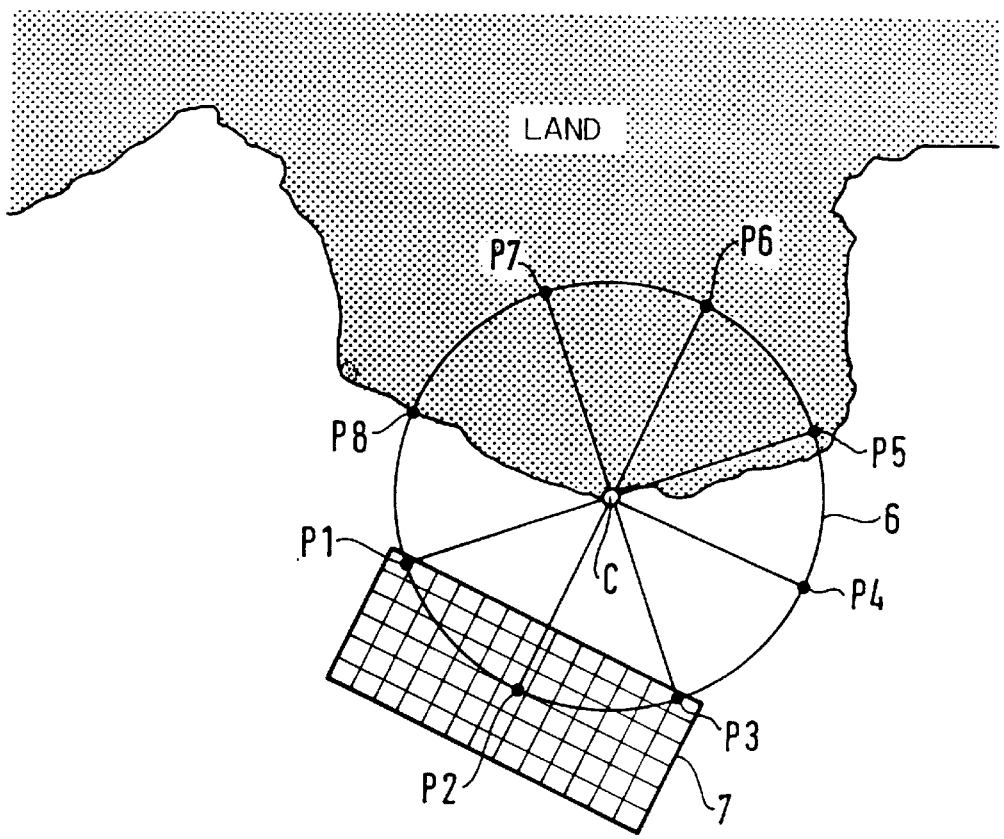
FIGS. 8 through 11 show the processing carried out in second pixel analysis windows to constitute the tangent vectors and to extend the current trace.

In step 40 a local analysis of the pixels of the image analogous to the analysis carried out in step 20 is carried out for a plurality of analysis windows centered on respective points called projected points. These projected points are pixels of the digital image 1 uniformly distributed around a circle 6 centered on the current trace end point C and having a predefined radius R. The number of projected points and the radius R of the circle 6 constitute parameters of the program implementing the method of the invention. FIG. 8 shows the circle 6 and eight protected points P1 through P8.

Figure 9:
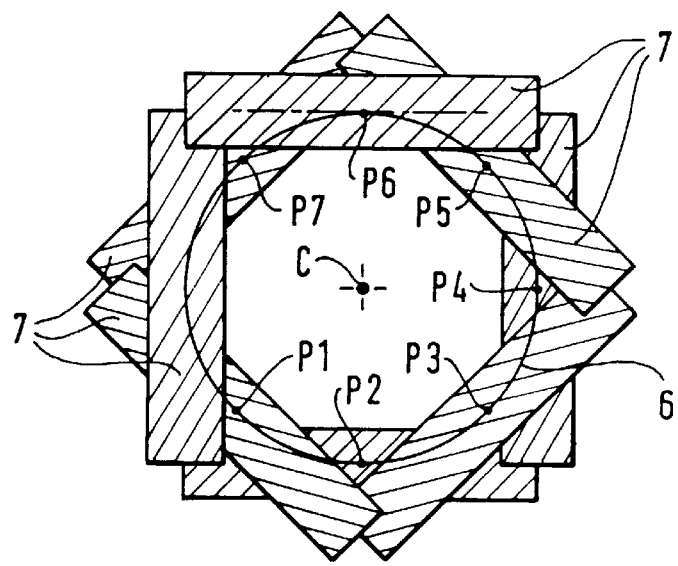

In step 40, each projected point constitutes the center for an analysis window 7 (exactly the same size as the window 3) the longer median line of which is perpendicular to the radius of the circle 6 passing through the projected point in question (see FIGS. 8 and 9).

Figure 10:
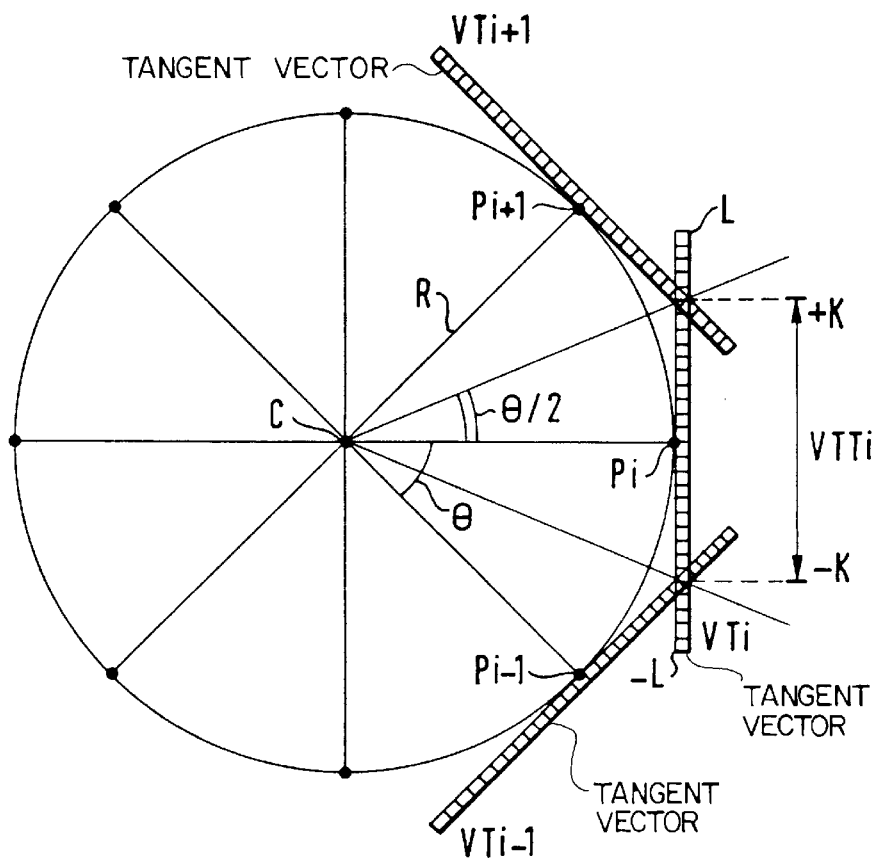

For each analysis window, a reference data vector VT is calculated in the same way as the vector V, the vectors VT being referred to as the "tangent vectors" hereinafter. FIG. 10 shows three tangent vectors $VT_{i-1}$, $VT_i$, $VT_{i+1}$ alongside three corresponding projected points $P_{i-1}$, $P_i$, $P_{i+1}$, each tangent vector VT comprising 2L+1 elements representative of the configuration of the level of the average of the mean gradient along the longer median line of the window 7 corresponding to the tangent vector in question.

The orientation of the straight line segment extending the current trace is given by the position of a pixel of the digital image to be looked for and corresponding to a particular element of one of the tangent vectors representing a maximum correlation between the tangent vectors VT and the vector V. This particular element is determined in the following manner.

Figure 11:
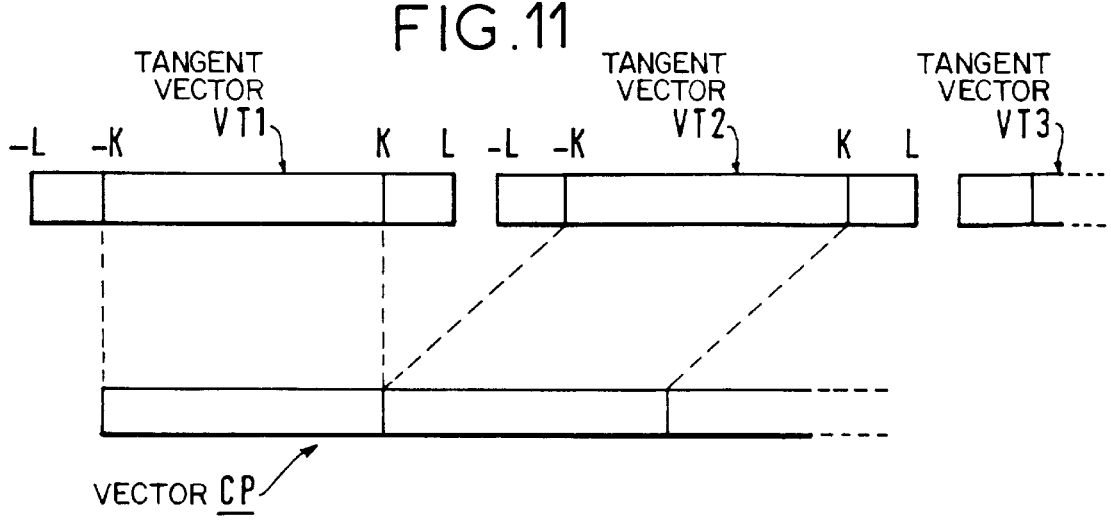

The elements of each tangent vector VT for which the index is between K and −K (K being the integer part of the product R.tan(θ/2)) are concatenated in a vector CP as shown in FIG. 11, the vector CP comprising N(2K+1) elements.

A data vector CPcorr comprising N(2K+1) elements is constructed by correlating the vector V and the vector CP using the relation:

$$CPcorr[j] = \sum_{i=L}^{i=+L} V[i]CP[j \oplus i]$$

where $\oplus$ is an operator defined on the integers whose values are equal to the remainder of the integer division of (i+j+N(2K+1)) by N(2K+1).

The element in the vector CPcorr having the maximal value is the particular element that represents the correlation maximum. The position of this particular element in one of the tangent vectors VT identifies the coordinates of a corresponding point on the longer median line of one of the analysis windows 7. The coordinates of this point in the previously identified analysis window identify the corresponding pixel in the digital image 1. This pixel is the required end pixel of the straight line segment extending the trace. It therefore determines the orientation of the extension straight line segment relative to the current trace end point.

On each iteration the orientation of the extension straight line segment is therefore determined as explained hereinabove and on the next iteration the active contour is extended by the extension straight line segment determined in the previous iteration.

The extension function of this contour extraction method is based on a starter/guide approach, the starter being the initial contour and the extension of the trace being guided by means of a similarity analysis of the image near a point of the starter and near the current trace end point.

There is claimed:

1. A semi-automatic method of extracting a contour from a contrasted area in a digital image stored in computer memory by tracing on a display screen the contour to be extracted in the digital image displayed on said screen, said method including the input of an initial contour into the digital image, an iterative process including, for each iteration, the deformation on the screen of an active contour to obtain a current trace of the contour to be extracted and the extension of the current trace by a straight line segment, this process being applied until the final trace of the contour to be extracted is obtained on the screen, the method including a first step of processing pixels of the digital image in a first analysis window centered on a point of the initial contour to determine a reference datum representative of a configuration of the digital image within said first analysis window and a second step, carried out for each iteration of the iterative process, of processing pixels of the digital image in second analysis windows distributed around the current trace end point to determine for each of said second windows, in an analogous manner to the first datum, for each of said second windows, a second datum representative of a configuration of the digital image within the second window in question and to determine, by correlating said second datum with said first datum, the orientation of the straight line segment extending the current trace.

* * * * *